Figure 1:
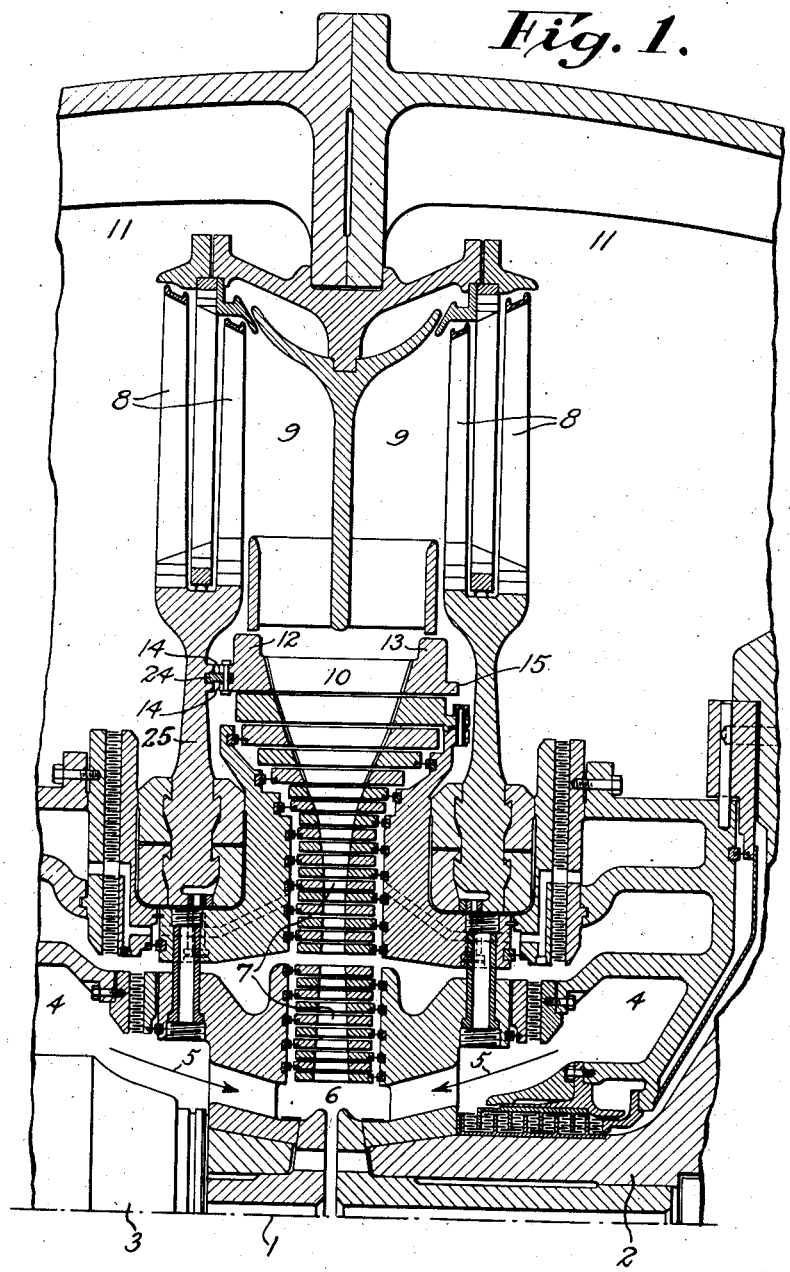

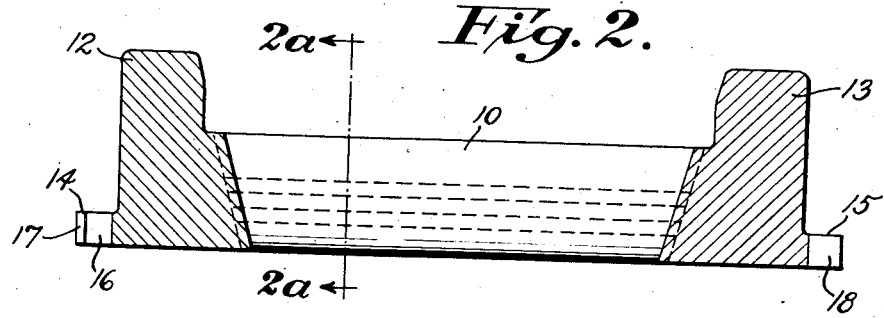
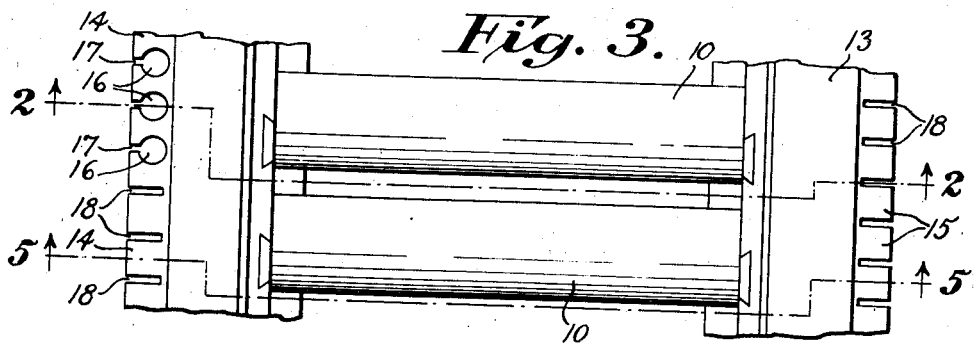
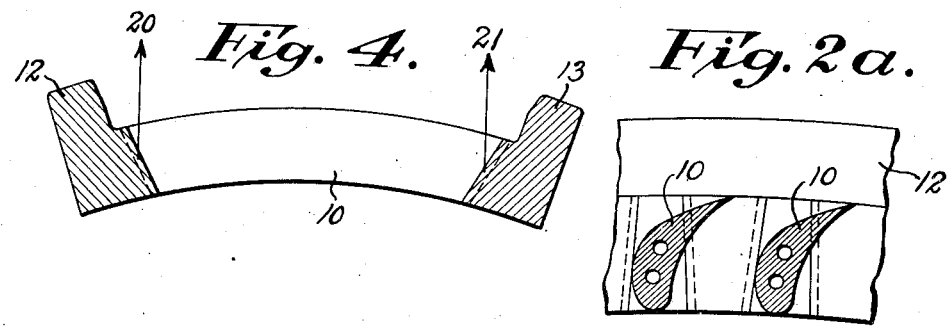
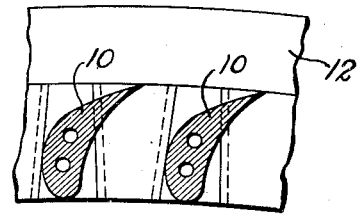
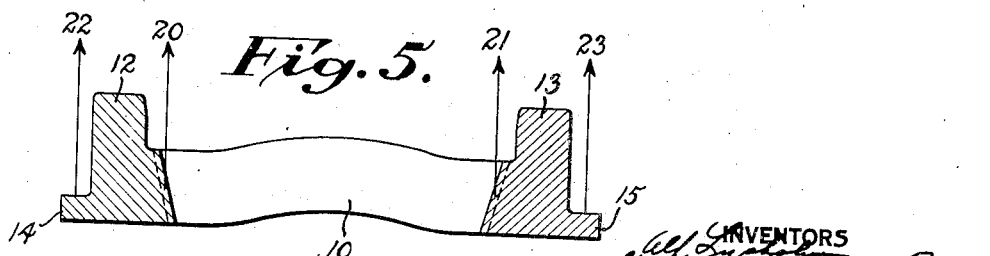

Patented May 2, 1933

1,906,697

UNITED STATES PATENT OFFICE

ALF LYSHOLM, OF STOCKHOLM, AND GUSTAV KARL WILLIAM BOESTAD, OF LIDINGO, SWEDEN, ASSIGNORS TO AKTIEBOLAGET LJUNGSTROMS ÅNGTURBIN, OF STOCKHOLM, SWEDEN, A JOINT STOCK COMPANY

BLADE RING FOR ELASTIC FLUID TURBINES

Application filed April 1, 1930, Serial No. 440,704, and in Germany April 6, 1929.

The present invention relates to improvements in blade rings for elastic fluid turbines and has particular reference to blade rings for radial flow turbines of the type comprising a plurality of annular blade rings interleaved to provide one or more channels through which motive fluid flows radially from the center of the turbine to the exhaust space thereof at the periphery of the blade system. Still more particularly, the invention relates to turbines of the above character in which the blade rings consist of spaced annular members or ring bonds connected by blades attached at their ends to confronting faces of adjacent ring bonds.

In turbines of the above character and particularly in turbines designed to operate at high speed, forces acting eccentrically on the ring bonds, which forces may be said to be in the form of bending moments, are produced when the turbine is in operation. These forces are particularly pronounced in the blade rings of the turbine situated radially most remote from the axis of rotation of the turbine and have an undesirable effect on the joints or connections between the ends of the blades and the ring bonds.

A general object of the present invention is to provide improved blade ring construction in which the undesirable effect of eccentrically acting forces produced by rotation of the blade rings is wholly or substantially eliminated. In general, it may be said that the above object of the invention is accomplished by providing a plurality of circumferentially separate inertia masses on the ring bonds, said masses being so disposed as to produce forces acting on the ring bonds in a manner tending to counteract the undesirable effect of forces imposed on the ring bonds due to rotation of the blade portion of the blade ring.

The more detailed nature of the invention and the advantages to be derived from its use will become apparent from a consideration of the following description of the several embodiments of the invention illustrated in the accompanying drawings.

In the drawings:
Fig. 1 is a central longitudinal section showing part of a turbine built in accordance with the present invention;
Fig. 2 is a section taken on the line 2—2 of Fig. 3;
Fig. 2a is a section taken on the line 2a—2a of Fig. 2;
Fig. 3 is a plan view of part of a blade ring built in accordance with the invention;
Fig. 4 is a section illustrating in exaggerated form the effect of centrifugal stresses on a blade ring of known type, and,
Fig. 5 is a section taken on the line 5—5 of Fig. 3 and illustrating in exaggerated form the effect of centrifugal stresses on a blade ring constructed in accordance with the present invention.

In Fig. 1, 1 is the center line of the turbine shaft, while 2 and 3 designate two turbine shafts adapted to rotate in opposite directions. The steam enters the turbine through channels 4 in the direction of the arrows 5 and passes from the central space 6 through the blade system 7, the space 9 between the radial flow blade system 7 and the axial flow blade system 8 to the outlet 11.

The radially outermost blades 10 in the radial flow blade system 7 are subjected to greater stress than are the blades of the inner blade rings. This is due to the fact that the blades in the outer blade ring rotate at greater peripheral speeds than do the blades of the inner blade rings and are therefore subjected to greater centrifugal forces. The stresses due to centrifugal force acting on the blades are transferred to the ring bonds 12 and 13 as bending moment forces acting eccentrically upon the ring bonds.

In order to produce bending moments opposing the bending moments produced due to rotation of the blades the ring bonds are provided on the sides opposite the sides to which the blades are secured with a plurality of circumferentially separated projections or the like forming inertia masses. Such projections are shown at 14 and 15 in Fig. 1, there being two series of radially spaced projections 14 in this particular embodiment, which cooperate with the supporting ring 24 secured to the turbine disc 25 to form the usual connection permitting limited relative movement between the blade ring and the turbine disc.

Referring now to Fig. 2 a blade ring is illustrated in section and on a larger scale than in Fig. 1. The blade ring comprises axially spaced ring bonds 12 and 13, between which are connected circumferentially spaced blades 10. The projections 14, in the present instance comprising a single series or row, and projections 15, are formed from axially extending rings or flanges on the ring bonds. The ring projecting from the axially outer face of the ring bond 12 is shown as provided with a plurality of circumferentially spaced radial holes 16, these holes being used for bolts adapted to secure the ring bond to the connecting ring 24. The ring on the axially outer face of the ring bond 13 may also be provided with such holes. As will be seen from Fig. 3, the ring on the bond 12 is slotted at 17 so that it is divided into a plurality of circumferentially separated projections which provide inertia masses producing bending moments acting on the ring bond when the blade ring is rotated. The lack of circumferential connection between the projections 14 prevents the centrifugal force generated from being taken up in circumferential tension in the ring from which the projections are formed. The holes 16 may be omitted and slots 18 used in cases where the projecting ring is not used as a part of the connection between the blade ring and the turbine disc. This form of construction is preferable for use on ring bonds such as the bond 13 shown in Figs. 1 and 2. If desired, the slots 17 and 18 may be circumferentially spaced so that there is a projection in axial alignment with each of the parts of the ring bonds where a blade is secured. This construction permits each section of the blade ring to be subjected to oppositely acting bending moments which are in substantially axial alignment.

Fig. 4 shows diagrammatically and with considerable exaggeration the form which the blades 10 would take, on rotation, if no projections were provided on ring bonds 12 and 13. The forces due to centrifugal force act on the blade supporting means as indicated by the arrows 20 and 21. Thus, the ring bonds 12 and 13 will be distorted as shown exaggeratedly in the figure and the blades will also tend to assume the position shown in this figure.

Fig. 5 shows in exaggerated manner the form which the blades 10 take if ring bonds 12 and 13 are provided with circumferentially separate inertia masses such as projections 14 and 15. In this case the forces 20 and 21 will be opposed by forces 20 and 22, the latter being produced by the action of centrifugal force on the projections 14 and 15 and tending to twist or distort the ring bond in a direction opposite the twisting tendency produced by forces 20 and 21. The blades 10 thus take a form producing less objectionable stresses on the ring bonds and the joint structure between the ring bonds and the blades. As will be evident, the portions of the structure providing the supporting means for the blades will be subjected to forces which act in substantially radial direction and will not be subjected to bending moment forces of objectionable magnitude. Projections 14 and 15 are preferably made integral with the ring bonds and as described above, are preferably formed, in the case of the ring bond connected to a turbine disc, from the ring-like projection which provides means for fastening the blade ring to the turbine disc. Obviously, however, these projections may be made separately and attached to the ring bonds.

In the above described embodiment only the radially outermost blade ring has been shown as provided with projections providing the desired inertia masses, but it will be evident that one or more of the inner rings may also be provided with such projections. It will be appreciated, however, that the radially outermost blade ring is subjected to the most severe bending moments or twisting forces because, in the first place, this blade ring has the greatest diameter and is therefore subjected to the greatest centrifugal forces and in the second place, because the blades of this blade ring are usually broader and therefore heavier than the blades of the rings of smaller diameter. Also, the maximum axial extent of the ring bonds is limited by other factors entering into the turbine design and in order to secure the requisite strength, the ring bonds of the outer blade ring are made with increased radial extent rather than increased axial extent. Increasing the radial extent of the ring bonds does not, however, provide in the ring bonds themselves the desired additional resistance to bending moments transmitted thereto from the blades.

Various modifications in the apparatus may be made without departing from the invention which, furthermore, is to be understood as not limited to the specific type of blade ring or turbine chosen by way of illustration. It will be evident that the invention is equally well applicable to blade rings having a plurality of rows of blades and is also equally well applicable in turbines with or without axial flow blade systems and in turbines of the single rotation type.

What we claim is:—

1. In a radial flow elastic fluid turbine, a blade ring comprising a ring bond, a plurality of turbine blades secured to said ring bond at one side of the center of gravity of the axial cross section of the bond, whereby said blades exert bending moments acting in one direction on said ring bond due to rotation of the blade ring, and means providing a plurality of circumferentially separate inertia masses at the opposite side of the center of gravity of said section for producing bending moments acting in opposite direction on said ring bond due to rotation of the blade ring.

2. In a radial flow elastic fluid turbine, a blade ring comprising axially spaced ring bonds, a plurality of blades secured between and to the axially inner sides of said ring bonds and circumferentially spaced projections arranged on the axially outer sides of said ring bonds, said projections producing bending moments acting on said ring bonds in opposition to the bending moments acting on said ring bonds due to rotation of said blades.

3. In a radial flow elastic fluid turbine, a blade ring comprising axially spaced ring bonds, a plurality of blades between said bonds, means for rigidly connecting the ends of said blades to said ring bonds, and a plurality of circumferentially separate projections arranged on the sides of said ring bonds opposite said connecting means, said projections constituting separate inertia masses for producing, upon rotation thereof, bending moments acting on said ring bonds in opposition to the bending moments imposed upon the ring bonds due to rotation of said blades.

4. In a radial flow elastic fluid turbine, a blade ring comprising axially spaced ring bonds, a plurality of blades secured between and to the axially inner sides of said bonds and an axially extending ring on the axially outer side of each of said ring bonds, each of said axially extending rings being slotted to provide a plurality of circumferentially separate projections and said projections constituting separate inertia masses for producing, upon rotation thereof, bending moments acting on said ring bonds in opposition to the bending moments imposed upon the ring bonds due to rotation of said blades.

5. In a radial flow elastic fluid turbine, a turbine disc, a blade ring comprising a ring bond and a plurality of blades secured to one side of said ring bond, and means for connecting the ring bond to the disc including a plurality of circumferentially separate projections on the opposite side of said ring bond, said projections constituting separate inertia masses for producing, upon rotation thereof, bending moments acting on said ring bond in opposition to the bending moments imposed upon the ring bond due to rotation of said blades.

6. In a radial flow elastic fluid turbine, a turbine disc, a blade ring comprising a ring bond and a plurality of blades secured to one side of said ring bond, and means including an axially extending ring on the side of said ring bond opposite said blades for connecting the ring bond and the disc, said axially projecting ring being slotted to provide a plurality of circumferentially separate projections and said projections constituting separate inertia masses for producing, upon rotation thereof, bending moments acting on said ring bond in opposition to the bending moments imposed upon the ring bond due to rotation of said blades.

7. In a radial flow elastic fluid turbine, a blade ring comprising axially spaced ring bonds and a plurality of blades secured between and to the axially inner sides of said ring bonds, and means for producing bending moments opposing the bending moments acting on said ring bonds due to rotation of the blades comprising circumferentially separate integral projections on the sides of said ring bonds opposite said blades.

8. In a radial flow elastic fluid turbine, a blade ring comprising axially spaced ring bonds, a plurality of circumferentially spaced blades secured between and to the axially inner sides of said ring bonds, and a plurality of circumferentially separate projections on the sides of said ring bonds opposite said blades, each of said ring bonds having a projection opposite the end of each of said blades and each of said projections constituting an inertia mass for producing, upon rotation thereof, a bending moment acting on the side of its ring bond in opposition to the bending moment imposed on the same ring bond due to rotation of the correspondingly opposite blade.

In witness whereof, we have affixed our signatures.

ALF LYSHOLM.
GUSTAV KARL WILLIAM BOESTAD.